United States Patent [19]

Erdell

[11] 3,709,686

[45] Jan. 9, 1973

[54] PROCESS FOR PRODUCING SELECTED COLOR PHOTOGRAPHS

[76] Inventor: John Buckland Erdell, 365 Clinton Avenue, Brooklyn, N.Y. 11238

[22] Filed: May 3, 1971

[21] Appl. No.: 139,694

[52] U.S. Cl. .................................96/2, 96/30, 96/42
[51] Int. Cl. ...............................................G03f 9/00
[58] Field of Search ...........96/2, 27, 30, 42; 35/28.3, 35/28.5; 350/321

[56] References Cited

UNITED STATES PATENTS 1,703,449   2/1929   Huebner..................................96/30

*Primary Examiner*—J. Travis Brown
*Assistant Examiner*—Alfonso T. Suro Pico
*Attorney*—Stoll & Stoll

[57] ABSTRACT

Method of producing selected color photographs from photographs recorded on black-and-white negative materials by printing the negative onto color print material with illumination filtered through a negative color film (filter) obtained by the following method:

a. making a master color specimen chart;

b. making a multi-color negative color film step wedge of said master chart;

c. making a single-color, multi-shade, multi-tint negative color film step wedge of said multi-color negative color film step wedge, and d. making individual negative color films (filters) of the individual wedge steps of said single color step wedge.

19 Claims, 21 Drawing Figures

Fig. I

INVENTOR.
JOHN B. ERDELL

INVENTOR.
JOHN B. ERDELL
BY Stoel and Stoel
ATTORNEYS

INVENTOR.
JOHN B. ERDELL
BY Stoee and Stoee
ATTORNEYS

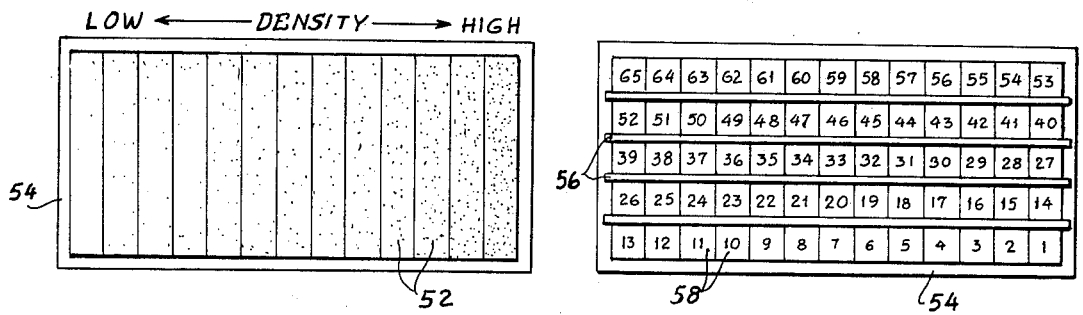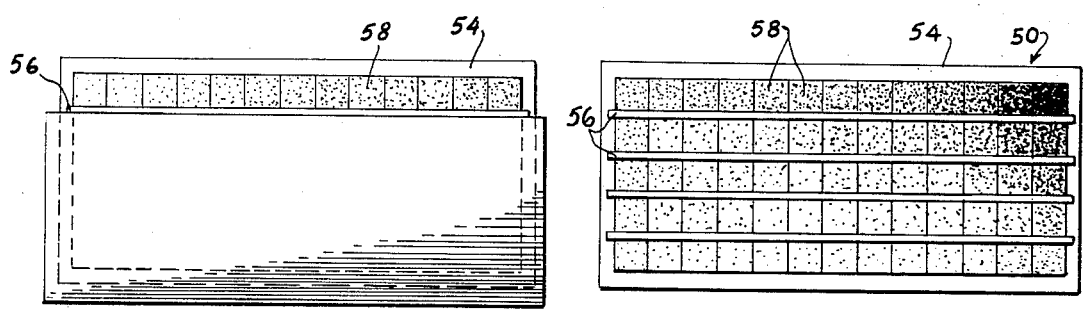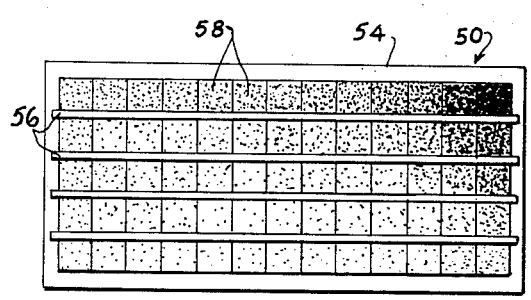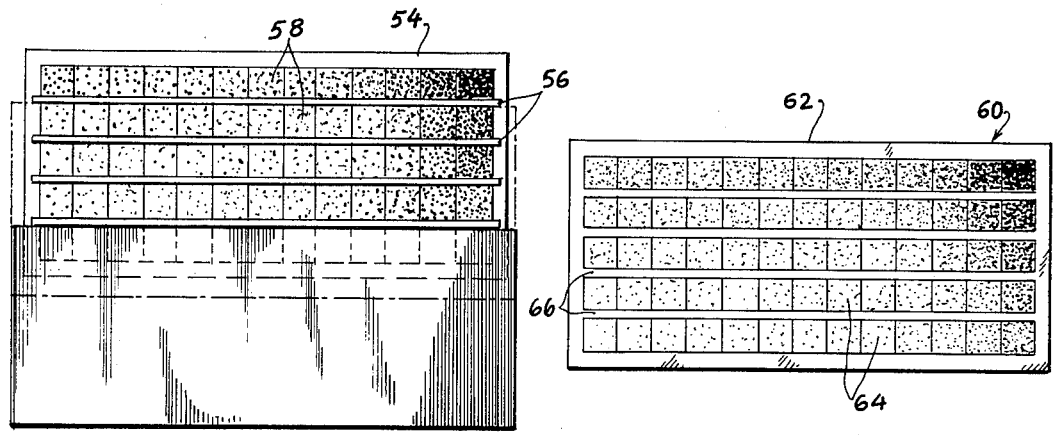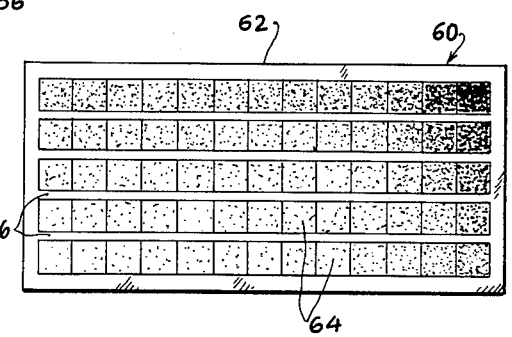

PROCESS FOR PRODUCING SELECTED COLOR PHOTOGRAPHS

BACKGROUND OF THE INVENTION

1. Field of the Invention

This invention relates to color photography and particularly to the production of pre-selected coloration of photographic positive prints.

2. Description of the Prior Art

In the more than one hundred years since the first color print process was described and demonstrated by Louis Ducos Duhauron (French Patent 83,061/1868) the problems of natural color photography have led to more proposals and suggestions than any other aspect of the photographic process. Literally thousands of patents deal with materials, methods and processes for obtaining natural color photographs by both additive color and subtractive color processes and materials. Within the last three and one-half decades almost natural color photography has been achieved by three-color subtractive processes employing multi-layered, light-sensitive, integral monopack film and paper photographic elements processed by color-forming development. The achievement of universally acceptable subtractive three-color photography materials and processes was accompanied by the development of improved apparatus and techniques for the printing, duplication, and copying of photographic color originals on a mass production scale.

With the understandable emphasis on achieving realistic, natural color photography, ancillary applications of color photography technology have been considerably ignored. One such application is the field of custom color photography for producing color photographs for illustrations of, for example, clothing and other wearing apparel in mail order catalogues. In the aforesaid illustrations it may be desirable to show, for example, that a dress is available in several different colors. In such work cost factors may dictate that one and the same model wearing one color of the dress should appear in the final catalogue wearing dresses of each available color. One method for obtaining the different colored photographs from black-and-white photographs is the localized color toning and tinting process described on von Gudenberg in British Patent Specification 515,674. Another method for obtaining colored photographs from black-and-white photographic prints is by the use of a rubber base, removable, masking resist and color-forming development as described in Lewis, et al., U.S. Pat. No. 2,359,653. Other applications of photographic processes for the rendition of unrealistic or false colors are in the fields of artistic interpretation and graphic arts as applied to eye-arresting advertising media. In these and other fields of personal photographic interpretation of original color scenes, the near natural color reproduction possible with today's color photography materials and processes is actually a handicap since such near perfection makes it difficult for individual expression and interpretation of ideas in terms of color rendition. Such individual expressions can be regarded as derivations from orthodox color photography whose aim is faithful chromatic rendition. The present invention deals with methods and materials for producing derivations from color photographs.

SUMMARY OF THE INVENTION

It is an object of this invention to provide a method for producing colored photographs from black-and-white negative records of the original subject.

Another object of this invention is to provide a method for producing multiple colored positive photographs from the same black-and-white negative record, each positive varying from another in color saturation or hue or both.

Still another object of this invention is to provide a method for altering the spectral quality of photographic printing illumination by the use of color filters obtained from a color step wedge photograph of a color specimen master chart.

A further object of the invention is the provision of a method of making such color filters.

In accordance with this invention the above and other objects are achieved by (1) constructing a master color chart of selected colored printing ink swatches, (2) making a multi-color, light-transmitting, color film step wedge of the master color specimen chart, (3) making a single-color, light-transmitting, multi-shade, multi-tint color film step wedge of said multi-color step wedge, (4) producing a light-transmitting filter with color film from each step of the single-color step wedge, (5) making a light-transmitting, neutral density step wedge printing exposure timing grid, and (6) printing a black-and-white photographic negative onto color print material for an exposure time previously determined by the step wedge timing grid, said printing being with illumination filtered through a color filter prepared from the single color step wedge. By the use of masks to prevent exposure of selected areas of the color print material only a portion of the illumination transmitted by the black-and-white negative will expose the print material. The exposed area is then masked off, the color filter used for the first printing exposure is removed and a different color filter is inserted in the path of the exposing illumination. In this manner a positive print having individual picture areas in two different colors is obtained from one and the same black-and-white photographic negative.

With present day panchromatically or orthochromatically sensitized negative emulsions, a photographic negative of a colored subject is a non-color selective, light-attenuating image of an original subject. If white light is incident on the negative, light passes through the clear areas of the negative; is stopped by the black, dense areas, and is transmitted in varying degrees of intensity depending on the photometric densities of the silver deposits ranging between the clear and the dense areas. If the illumination transmitted by the negative passes through a colored light-absorbing filter, the attenuated and colored beam of illumination can be used to expose a light-sensitive photographic print material. If the print material is a color print material, the color of the exposing illumination determines the color of the image formed in the color print material upon processing same. Thus if the exposing illumination incident on the color print material is red, the color print material yields a cyan or minus red image, that is, the print image is in the complementary color to the color of the exposing illumination. In like manner, if the exposing illumination is a complementary color such as minus blue or yellow, the color print will be blue, and magenta or minus green illumination will produce a green print.

Stated otherwise, the color of the illumination used to expose the color print material and the color of the resulting photographic print will be in the relation of primary color to complementary color or vice versa. However, if a reversal type of photographic color film is used for the end product, the color positive, the color of the positive image will be related directly to the color of the exposing illumination, that is, red light will produce a red positive, blue light a blue positive, etc. Of course, as is well known in the art, lack of color saturation in the exposing illumination produces some color dilution in positives produced on color print material and considerable color dilution if the reversal type of color print paper or film is used as the final color print material.

BRIEF DESCRIPTION OF THE DRAWING

FIG. 13 shows a multi-density test chart consisting of a plurality of parallel paper strips of different density mounted on a support.

FIG. 14 shows the same multi-density test chart divided into a plurality of serially numbered wedge steps.

FIG. 15 shows a mask applied to the multi-density test chart (the wedge step numbers are omitted for purposes of clarity) for the first step in a sequence of masking and exposing operations whereby the test chart is exposed to a pre-selected filter as shown in FIG. 8.

FIG. 16 illustrates subsequent masking and exposing steps in this procedure.

FIG. 17 shows the final result after successive masking and exposing operations.

FIG. 17A is a photographic reproduction of the step wedge shown in FIG. 17.

DESCRIPTION OF A PREFERRED EMBODIMENT OF THE INVENTION

Figure 1:
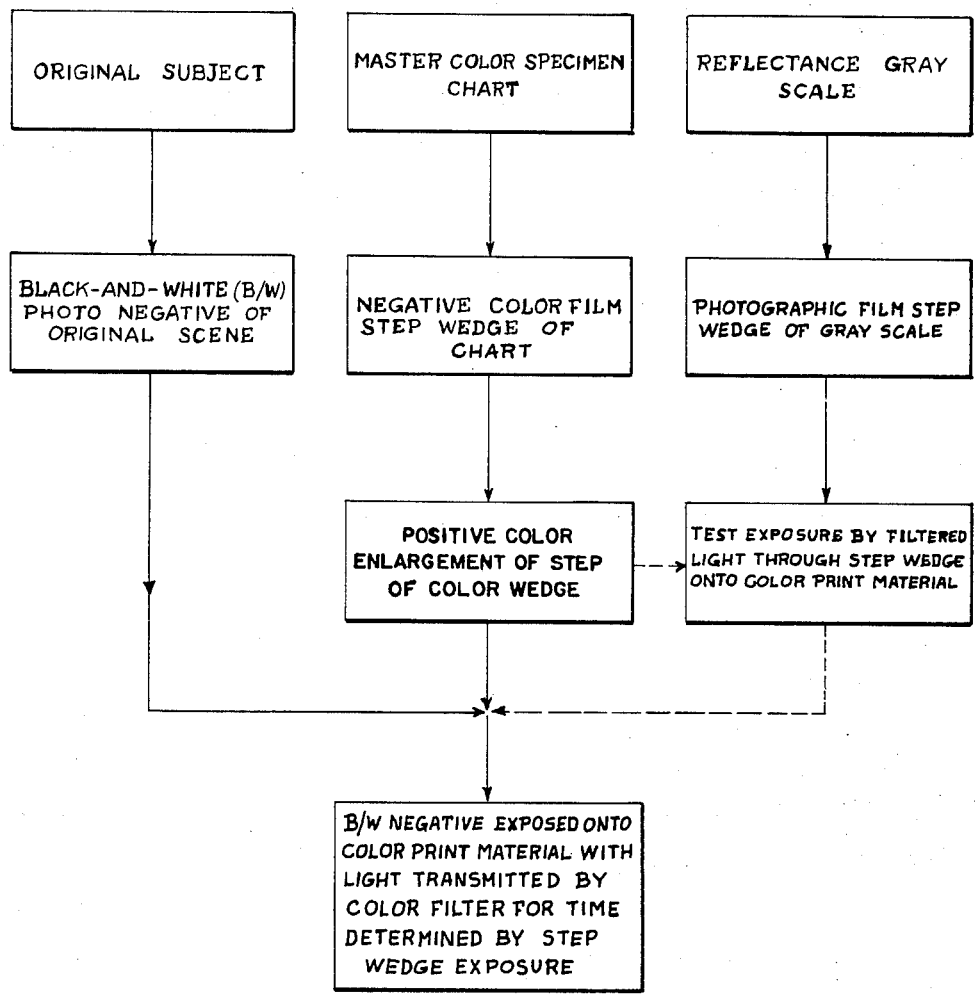
FIG. 1 is a flow chart showing the several steps of the process herein claimed.

As previously indicated, the initial step in the present method is the photographic production of a light-transmitting color step wedge from a master color specimen chart which, preferably, also includes a neutral density or gray scale. Master color specimen chart 10 is prepared in the following manner (dimensions given are purely illustrative):

Strips of color swatches 12 (1 inch wide by 12 inches long) printed with colored printing inks on uncoated card stock are adhesively mounted horizontally one above the other on a suitable support such as triple thickness (0.3 inch) artists' illustration board 14 with a matte surface and light gray in color. The color swatch strips are mounted so as to leave spaces 16 of about 0.10 inch between the strips. The light gray spaces between the strips result in dark, separating borders between the colors on the negative step wedge film. The swatch strips are marked off with transverse lines 18 at intervals of one inch to serve as guide lines for positioning an opaque mask as subsequently described and for forming lines of demarcation between the individual steps of the step wedge.

The color swatches making up the master chart should include the primary colors red, blue and green; complementary colors cyan, magenta, and yellow; various intermediate colors such as yellow orange, orange, red orange, red violet, purple, blue violet, blue green, yellow green; and hues such as brown, orange brown, sepia, and other intermediate colors and hues if desired. For illustrative purposes, the drawing arbitrarily shows only eight swatches in the following colors: brown, green, blue, purple, red, orange, yellow and cyan.

Each of the colored swatches may be coded by the use of the initial letter (or letters) of the name for each color and hue as the identification thereof as, for example, Br for brown, G for green, Bl for blue, P for purple, R for red, O for orange, Y for yellow and C for cyan. If there are several varieties of one color, then the identification symbol is compounded using a numeral after the letter such as Y1 = yellow one, Y2 = yellow two, etc. Although this is not shown in the drawing, the identification codes thus will become part of the step wedge prepared from the master color specimen chart and will also become part of the color filters prepared from the step wedge images.

A gray scale of white, black and eight intermediate densities covering a reflectance density range of from about 0.01 to about 1.35, in increments of about 0.15 reflectance density, may also be included in the master chart in the form of 1 inch by 12 inch strips of each density arranged lengthwise beneath the colored swatch strips. However, for the purpose of clarity of description, the gray scale will be separately shown and described.

Figure 2:
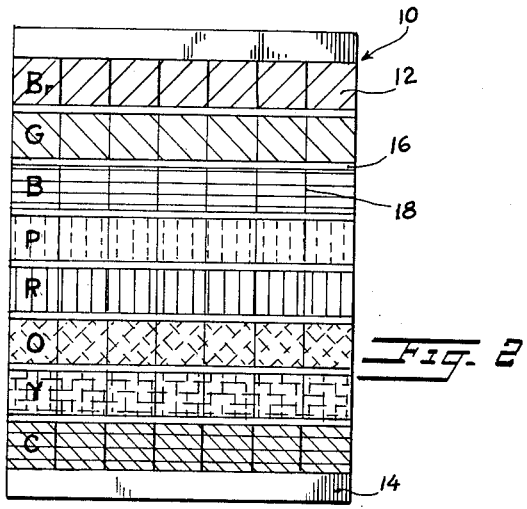
FIG. 2 is a plan view of a master multi-color specimen chart.
Figure 2A:
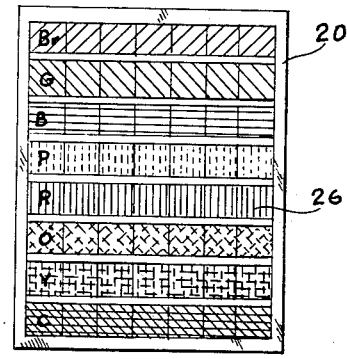
FIG. 2A shows a negative film of said master color chart.
Figure 3:
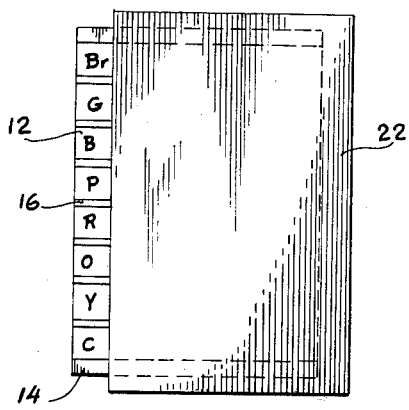
FIG. 3 shows the first step in the sequential masking and exposing of either the master color chart shown in FIG. 2 or the negative film thereof shown in FIG. 2A.
Figure 5:
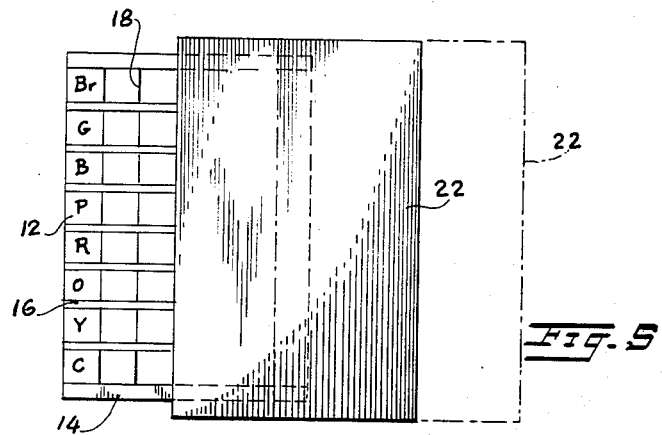
FIG. 5 shows the third step in said procedure, and such additional steps are employed as may be necessary.
Figure 4:
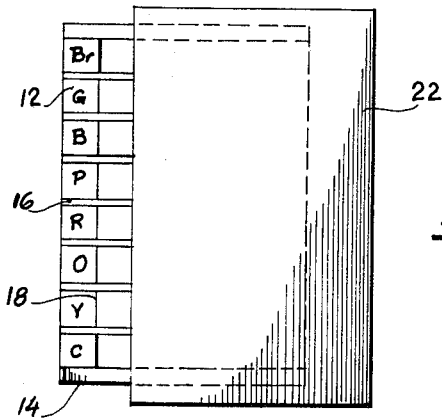
FIG. 4 shows the second step in said sequential masking and exposing procedure.
Figure 7:
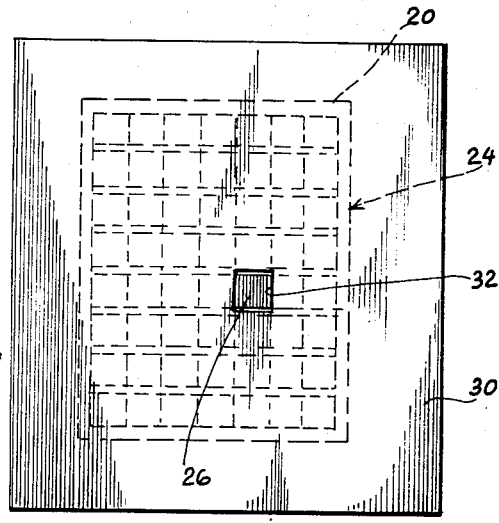
FIG. 7 shows another mask applied to the multi-color step wedge film of FIG. 6, said mask having a single window to expose a single wedge step of said wedge film.
Figure 6:
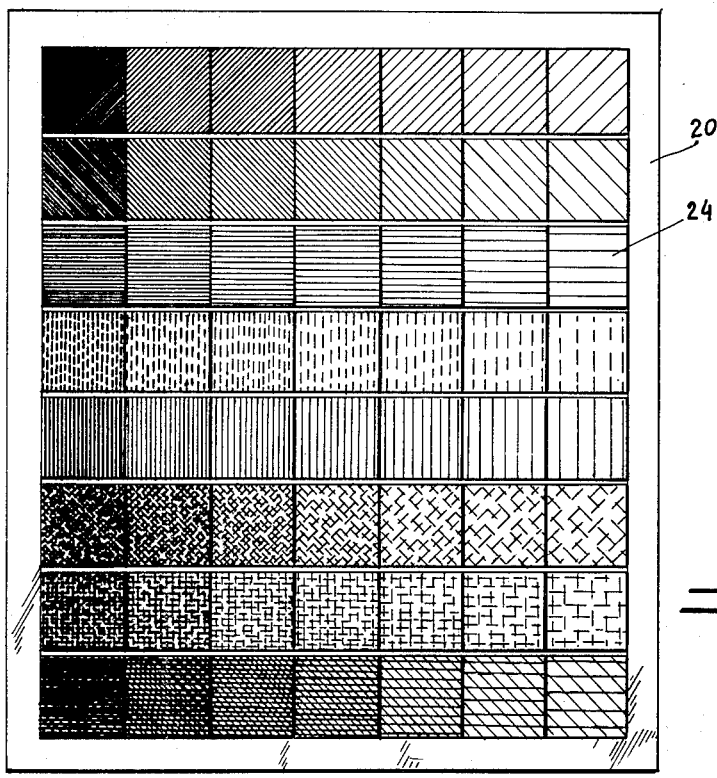
FIG. 6 is a plan view of a multi-color negative step wedge film which is produced by the sequential masking and exposing procedure illustrated in FIGS. 3, 4 and 5.

The master chart is then photographed onto a negative working color film 20 (such as Ektacolor Type L) in a process camera to determine the exposure for obtaining optimum color rendition. See FIG. 2A. Having determined the optimum exposure to be, for example, 6 seconds under the particular conditions of illumination, color temperature filter factor and lens aperture, a step wedge of the original chart is exposed onto color film 20 by masking 11 inches of the master chart from top to bottom with a mask 22 in the form of an opaque black card and photographing the unmasked portion of the chart for 1 second. See FIG. 3. The mask is then moved to uncover an additional 1 inch length of each strip from top to bottom of the chart and another exposure of one second is made. Thus the first section exposed has now received an exposure of 2 seconds and the second section of an exposure of 1 second. See FIG. 4. This procedure of uncovering the master chart in successive steps of 1 inch along the length of the strips and exposing for 1 second for each step is repeated across the entire length of the strips. See FIG. 5. The last 1 inch portion of the strips thus received 1 second exposure, the first portion received 12 seconds, and the seventh area from the long exposure end received 6 seconds, the optimum exposure for best color rendition as determined by the test exposure. The exposed color film is processed as prescribed by the manufacturer and a multi-color negative step wedge 24 of the original chart is obtained. See FIG. 6.

The individual steps 26 have the configuration of a 1 inch by 1 inch square, and each is colored to correspond to an original color of the master color chart 10 intensified in direct proportion to the number of exposures in excess of one. By referring to a grid table, the relative exposure and original color for any individual step on the wedge negative can be obtained.

The negative step wedge produced from the Master Color Chart is used in the enlarger and is projected onto color print positive material and a test exposure is made. This test is to insure that the optimum color rendition of the Master Color Chart is accurate. When all the colors are accurately recorded on the color photo print paper, then any of these colors can be recorded separately by using a colored filter of any desired color.

Color filters for controlling the color of the positive printing illumination are prepared by copying a specimen of each color represented on the Master Color Chart using the exposure which will produce the optimum color as produced on the color step wedge. Each color is copied using exactly the same lighting, exposure, lens opening, etc. which was used on the negative step wedge to produce the optimum color rendition. A separate filter is made of every color and gray scale similarly.

Figure 12:
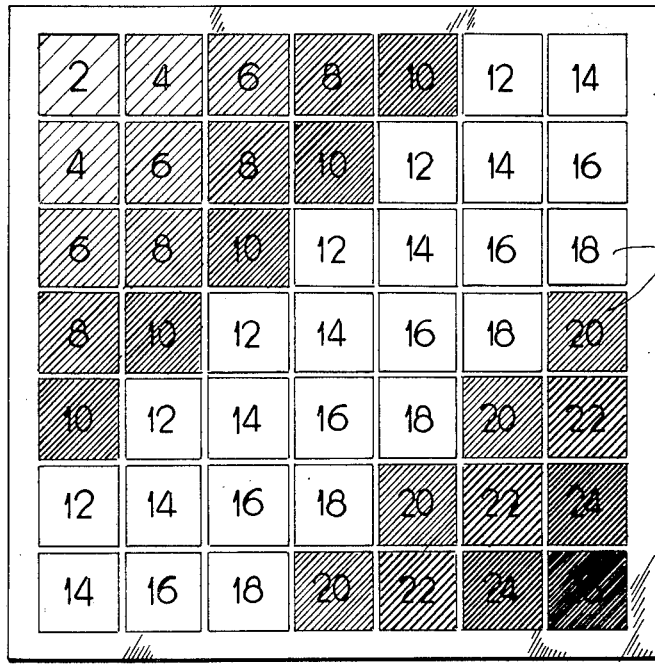
FIG. 12 is a single color, multi-shade and multi-tint step wedge film resulting from the masking and exposing procedure illustrated in FIGS. 9, 10 and 11, the appropriate shading being only partially executed in FIG. 12 for purposes of clarity.
Figure 9:
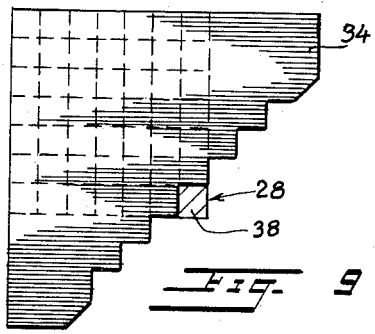
FIG. 9 shows another masking device applied to the multi-color step wedge film of FIG. 6, said masking device being shown in the first of a sequential series of masking and exposing operations.
Figure 10:
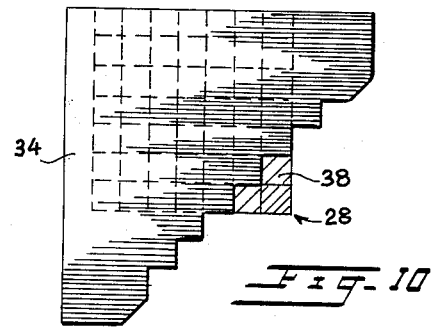
FIG. 10 is a view similar to that of FIG. 9, but showing the second step in the masking and exposing procedure.
Figure 11:
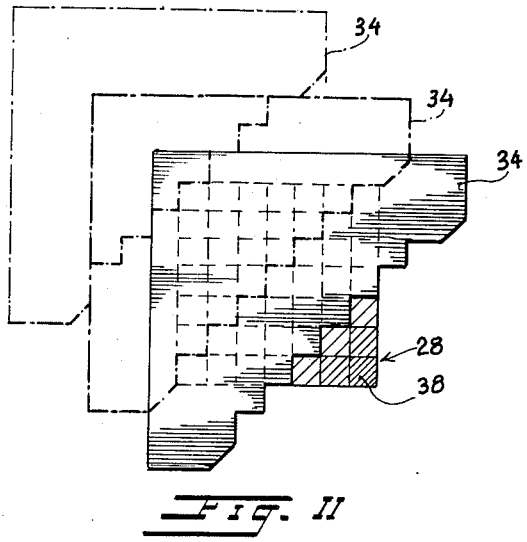
FIG. 11 shows a third step in said procedure, and it indicates a plurality of additional such steps sufficient to result in the stepped exposure of the entire multi-color step wedge film of FIG. 6.
Figure 8:
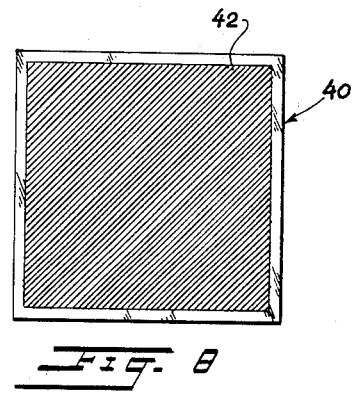
FIG. 8 shows an enlargement of the single wedge step which is exposed through the mask of FIG. 7, said enlargement constituting a negative film suited for use as a color filter, it being also understood that such color filter may by produced by exposure through the mask of FIG. 7 to the single color step wedge film of FIG. 12.
Figure 19:
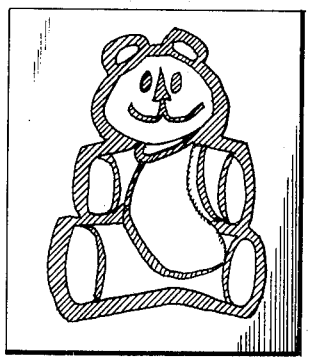
FIG. 19 shows the same photograph colored as a result of exposure to said color filter.
Figure 18:
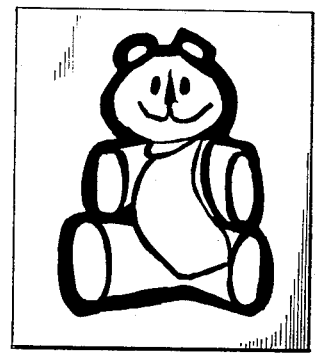
FIG. 18 is an illustration of a black-and-white photograph which is to be colored by exposure to a color filter of the type shown in FIG. 8.

Color filters in individual colors and shades and tints of those colors may be made directly from multi-color step wedge 24 or they may be made from a single-color step wedge 28 which is itself made from said multi-color step wedge 24. A masking process, similar to the one above described with respect to the master color chart 10, is used in the making of the single-color step wedge. Thus, a mask 30, having a single opening 32 which corresponds to the shape and dimensions of a single step 26 (including its frame) is applied to the multi-color step wedge 24, and another mask 34 is applied to another negative working color film 20a (FIG. 12) similar to color film 20. Mask 34 may be stepped along one edge to coincide with diagonal rows of individual steps 26 (including frames) of the multi-color step wedge 24. Stepped, sequential exposures of color film 20a to illumination filtered through a single step 26 will produce a single-color step wedge having a plurality of individual steps in progressively intense tints and shades of the color of the exposed step 26. As an illustration, the individual steps 38 of single-color step wedge 28 are numbered to correspond to the duration of their exposure (in seconds) to the individual step 26 of the multi-color step wedge.

Individual color filters 40 for controlling the color of the positive printing illumination are prepared from the individual colored image area of the single-color (or multi-color) step wedge. To prepare the filters all but one color image area of the color step wedge is blocked off by above-mentioned mask 30. The color step wedge negative is placed in an enlarger and the unmasked image area is projected through window 32 as an enlarged optical image onto a negative working color film 42 such as Ektacolor Type L for an exposure time as determined by a prior test exposure on the same type of color film. In the manner described, color filters are prepared from each color image area of the color step wedge by shifting the opaque mask to block off all but the new image area to be exposed.

For determining the correct printing exposure for obtaining the desired colored positive with a given color filter, a test exposure is made on the color print material through a neutral density step wedge 50 and by means of illumination transmitted by a given color filter 40. Neutral density step wedge transparency 50 can be prepared as follows: Strips 52 of neutral density, matte paper 0.75 inch wide by 5.0 inches long and ranging from density 0.01 to density 1.20 in 13 steps of 0.10 density, are adhesively secured to a mounting board 54 5 inches wide by 10 inches long, the lowest density strip is mounted along one 5 inch edge of the card and the high density strip is mounted along the opposite edge with the strips of intermediate density mounted in numerically sequential order between the low and the high density edge mounted strips. Narrow, black tape about one-sixteenth of an inch wide is used to divide each density strip into five equal areas. The individual gray scale areas 58 are identified by consecutive numbers from 1 to 13 for the lowermost row, 14 to 26 for the adjacent row, etc., up to 53 to 65 for the density areas on the topmost row. The complete gray scale 60 is then photographed full size in a copy camera onto photographic negative film 62. Since the individual gray scale areas 64 vary in density by 0.10 over a total density scale of 1.20 the sensitometric response curve of the negative film should be such that the straight line portion of the characteristic curve is capable of faithfully recording the equal-increment gray scale density range of 0.01 to 1.20 inclusive. For convenience in using the film copy 50 of the gray scale, narrow black tape 66 may also be applied to the film copy to divide each density image into five equal areas. The ridge of the black tape is also useful in positioning an exposure mask.

The neutral density step wedge transparency 50 is used to determine the correct printing exposure time for producing optimum color reproduction on a given color print material for a given color filter used in the same enlarger, same illumination, etc., etc., as will be used for making the color print. To determine the correct printing exposure the neutral density step wedge transparency is held in a printing frame in close contact with a color print material such as, for example, Ektaprint C paper. The glass side of the printing frame is turned towards the lens of an enlarger which is equipped with a shutter and a filter holder containing one of the color filters prepared from the master color specimen chart as described in detail in the foregoing. With the enlarger shutter closed, an opaque mask covering the entire step wedge in the printing frame is moved to uncover the top row of density areas. The shutter is then opened for, as an example, thirteen seconds then is closed. The mask is moved down to uncover the next lower row of density areas across the step wedge and another exposure of 13 seconds duration is made. This procedure is repeated for each descending row of density areas across the wedge, the lowermost row of which received an exposure of thirteen seconds while the top row was exposed for a total of 65 seconds. The exposed color print paper is then processed in accordance with the manufacturer's directions.

Assuming that the photographic negative material used for making the reproduction of the paper gray scale had the sensitometric characteristics necessary to make a photometrically accurate copy thereof, the thirteen second step exposure for each row of densities produced an exposure ratio range of one to 16 times across the wedge and onto the color print material. The exposure ratio range from the darkest to the lightest densities of the step wedge was one to 80 times. With such a wide range of the exposures a color print material such as Ektaprint C will have extremely underexposed areas of no color as well as heavily overexposed, dense, blocked color areas. Somewhere between the extremes is likely to be found an area of satisfactory color reproduction for the particular filter used. The numerical designation of the color area deemed satisfactory is an indication of the relative exposure incident on that area of the color print material. All other conditions such as lens aperture, lamp voltage, lens-to-printing frame, processing conditions, raw materials, etc., etc., remaining the same, the relative exposure indicated for the satisfactory color reproduction area will produce comparable color quality on the colored positive photograph made with the same color filter.

For the production of colored photographs from non-color record negatives, a black-and-white negative of the photograph to be printed is placed in the enlarger which has a color filter, prepared as previously described, in the filter holder. An enlarged image of the negative is projected onto color print paper by means of illumination transmitted first by the negative and then by the selected color filter, and for a time as determined by a prior step wedge test as described above.

For variations in the color produced with a given color filter on a given color print material, the color quality of the illumination in the enlarger light head can be varied to illuminate the negative with other than white light as defined as color temperature in terms of degrees Kelvin. By so varying the color of the enlarger illumination in combination with the use of a colored filter, a wide range of color variations is possible with one and the same filter.

While the invention has been described as applied to projection or optical printing, it is obvious that the method can also be used in contact printing to produce selected color photographs. Since the relative photographic speed of color print materials is built into such materials for optical or projection printing, the enlarger is used as was described above in making the step wedge exposure test with the wedge in contact with the color print material in a printing frame. In this type of contact printing the enlarger is used as a controlled illumination source.

The present method of selective coloration of photographic prints has many commercial and industrial applications. As an example, in designing textile patterns where duplicate patterns can be photographically reproduced in a wide variety of colors and combinations thereof from one and the same photographic negative of an original design. The present method can be used with texture screens, graphic designs and symbols. The method is particularly useful in the preparation of overhead projection overlays. The method is also readily adaptable to commercial and industrial applications of photography where creative color photography is an effective means for visualization of products to determine the color or colors to be selected, for example, for the packaging of such products.

Variations modifications may be made in the method and it is intended to cover such modifications as would occur readily to those skilled in the art as broadly as possible, within the scope of the following claims.

The foregoing is illustrative of the basic principles of the invention and may be modified and expanded within the broad scope of the appended claims. An example of the variations which are encompassed within these principles of the invention and the scope of the claims relates to the method of making a step wedge. In the foregoing description, the method calls for progressively increasing the area which is being exposed, and progressively decreasing the area which is being masked, in successive, sequential steps. Alternatively, the same results may be attained by progressively decreasing the area which is being exposed, and progressively increasing the area which is being masked, also in successive, sequential steps. In the one case (first above described), the mask is initially applied to the entire master color chart (or equivalent) except for the first exposure area, and the mask is then successively moved in stages to expose progressively increasing areas of the master color chart. In the latter case (the alternative method), the mask is initially applied to only one exposure area of the master color chart, and it is then moved in successive stages to expose progressively decreasing areas of said master color chart. The principle remains the same, it is only the direction of approach that is reversed.

I claim:

1. A method of making negative color filters for use as photographic color filters, comprising the steps of:
   a. preparing a master multi-color specimen chart,
   b. making a step-wedge film of said master multi-color specimen chart, and
   c. making individual negative color films in different shades and tints of the individual wedge steps of said step wedge film.

2. The method of claim 1, wherein:
   a. a multi-color step wedge film is made of said master multi-color specimen chart, and
   b. a single-color, multi-shade and multi-tint step wedge film is made of the individual wedge steps of the multi-color step wedge film,
   c. the individual negative color films being made of the individual wedge steps of said single-color, multi-shade, multi-tint step wedge film.

3. The method of claim 2, wherein:
   a. the master multi-color specimen chart is prepared by:
      i. arranging a plurality of color swatch strips in spaced parallel relationship, and
      ii. attaching said color swatch strips to a support board, and
   b. the multi-color step wedge is made by:
      i. repeatedly exposing the master multi-color specimen chart to a color film, while
      ii. sequentially masking portions of the master multi-color specimen chart from the color film transversely of the color swatch strips,
      iii. thereby progressively exposing successive transverse portions of the multi-color specimen chart to said color film.

4. The method of claim 3, wherein the single-color, multi-shade and multi-tint step wedge is made by:
   a. repeatedly exposing an individual wedge step of the multi-color step wedge film to a color film, while
   b. masking all of the other wedge steps and
   c. sequentially masking portions of the color film from said individual wedge step,
   d. thereby progressively exposing successive portions of said color film to said individual wedge step.

5. The method of claim 3, wherein:
   a. progressively decreasing areas of the master multi-color specimen chart are masked, while
   b. progressively increasing areas of said master multi-color specimen chart are exposed.

6. The method of claim 3, wherein:
   a. progressively increasing areas of the master multi-color specimen chart are masked, while
   b. progressively decreasing areas of said master multi-color specimen chart are exposed.

7. The method of claim 4, wherein:
   a. progressively decreasing areas of the multi-color step wedge film are masked, while
   b. progressively increasing areas of said multi-color step wedge film are exposed.

8. The method of claim 4, wherein:
   a. progressively increasing areas of the multi-color step wedge film are masked, while
   b. progressively decreasing areas of said multi-color step wedge film are exposed.

9. The method of producing photographs in color from black-and-white original subjects which comprises printing a black-and-white internegative record of a black-and-white original subject onto color print material with light transmitted through a color filter produced photographically from a reflectance specimen of a colored printing ink.

10. The method of claim 9, wherein:
    a. a master chart of reflectance specimens of colored printing inks is prepared,
    b. light transmitting filters of the reflectance color specimens are photographically produced, and
    c. a black and white internegative record is printed onto color print material with light transmitted by at least one color filter produced photographically from a selected color reflectance specimen.

11. A method of making a multi-color step wedge, comprising the steps of:
    a. preparing a master multi-color specimen chart, and
    b. repeatedly exposing said master chart to a color film, while
    c. interposing a mask between said master chart and said color film, and
    d. intermittently moving said mask in successive steps to progressively change the extent of the masked and exposed areas.

12. The method of claim 11, wherein:
    a. progressively decreasing areas of the master multi-color specimen chart are masked, while
    b. progressively increasing areas of said master chart are exposed.

13. The method of claim 11, wherein:
    a. progressively increasing areas of the master multi-color specimen chart are masked, while
    b. progressively decreasing areas of said master chart are exposed.

14. A method of making a single-color, multi-shade, multi-tint step wedge, comprising the steps of:
    a. preparing a single color specimen, and
    b. repeatedly exposing said single color specimen to a color film, while
    c. interposing a mask between said color specimen and said color film, and
    d. intermittently moving said mask in successive steps to progressively change the extent of the masked and exposed areas.

15. The method of claim 14, wherein:
    a. progressively decreasing areas of the color film are masked, and
    b. progressively increasing areas of said color film are exposed.

16. The method of claim 14, wherein:
    a. progressively increasing areas of the color film are masked, and
    b. progressively decreasing areas of said color film are exposed.

17. A multi-color step wedge comprising:
    a. a color film of a multi-color specimen chart,
    b. said color film being divided into a plurality of steps for each color specimen, c. each such step differing in shade or tint from the other steps of the same color by reason of different exposure to the multi-color specimen chart.

18. A single-color step wedge, comprising:
a. a color film of a single-color specimen,
b. said color film being divided into a plurality of steps
c. which differ from each other in shade or tint by reason of different exposure to the color specimen.

19. The method of producing photographs in color from black-and-white original subjects which comprises the steps of:

a. preparing a master multi-color specimen chart,
b. making a step-wedge film of said master multi-color specimen chart,
c. making individual enlarged negative color films in different shades and tints of the individual wedge steps of said step wedge film, and
d. printing a black-and-white internegative record of a black-and-white original subject onto color print material with light transmitted through said individual enlarged negative color films.

* * * * *